Figure 1:
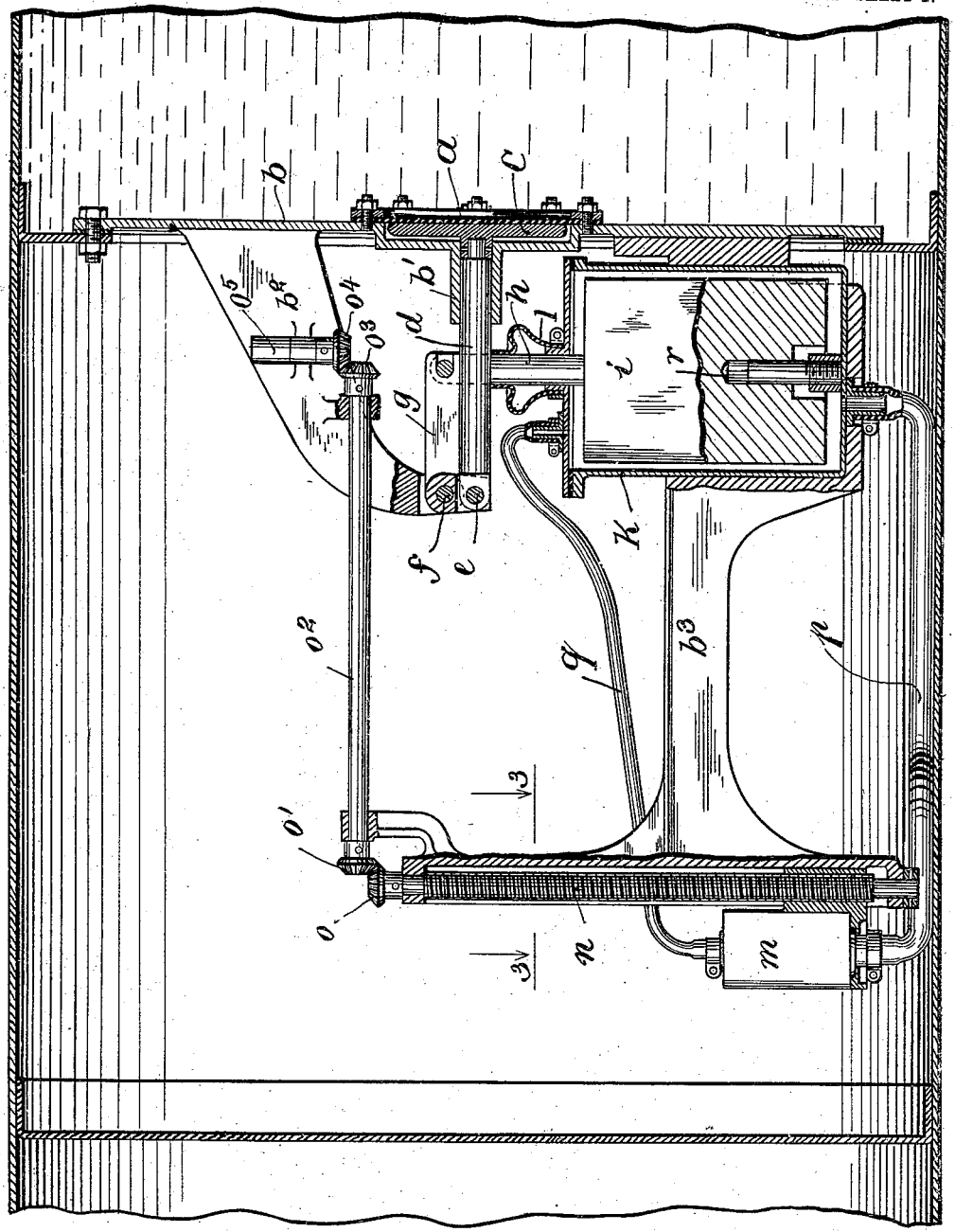

G. C. DAVISON.
DEPTH REGULATING MECHANISM FOR MOVING VESSELS.
APPLICATION FILED APR. 15, 1909.

946,659. Patented Jan. 18, 1910.
3 SHEETS—SHEET 1.

G. C. DAVISON.
DEPTH REGULATING MECHANISM FOR MOVING VESSELS.
APPLICATION FILED APR. 15, 1909.
946,659.
Patented Jan. 18, 1910.
3 SHEETS—SHEET 2.
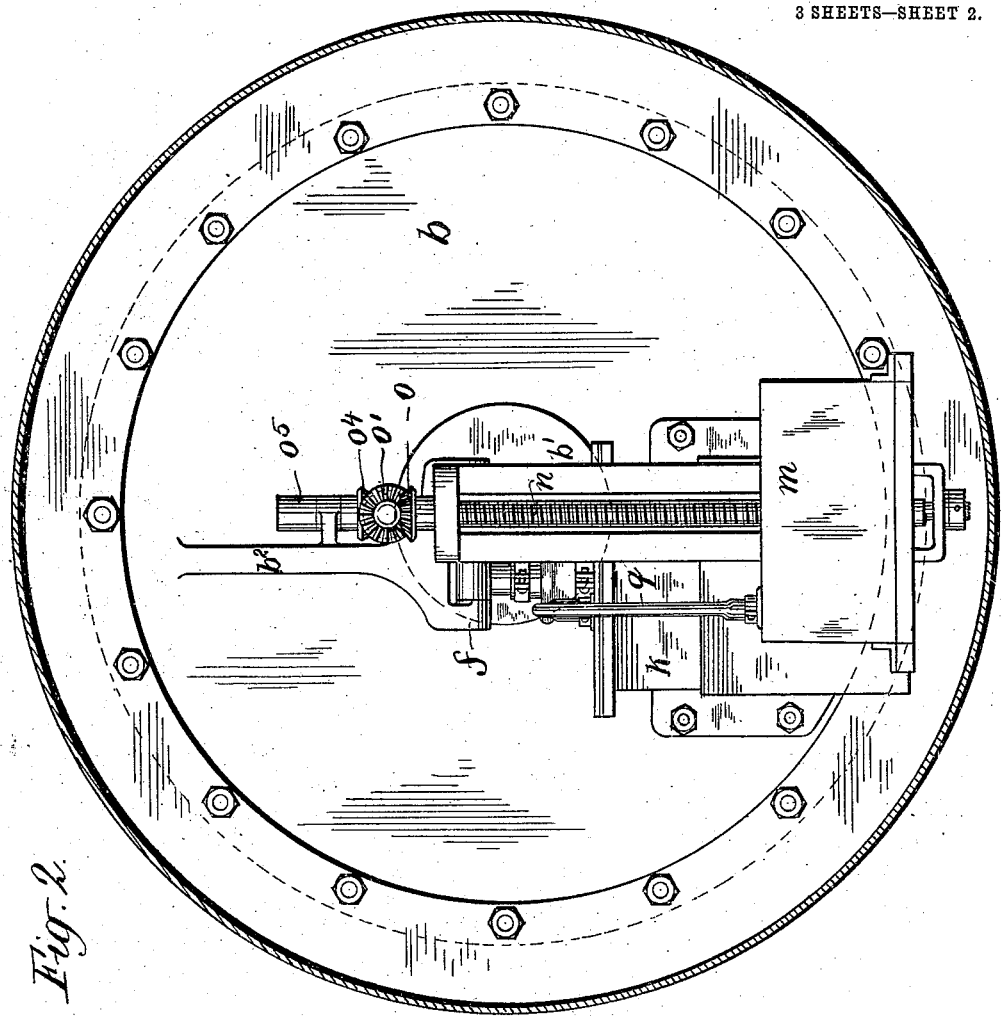
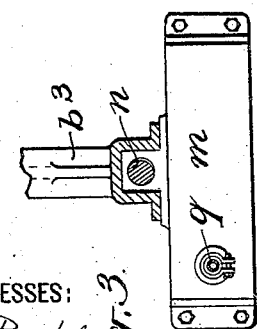
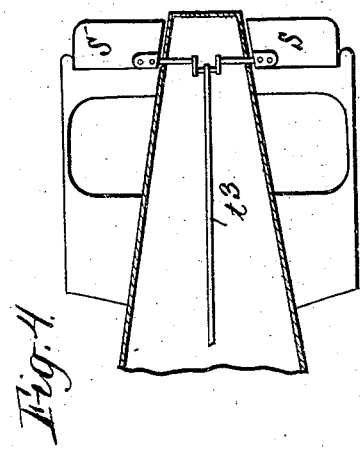
WITNESSES:
INVENTOR
Gregory C. Davison
BY
ATTORNEYS G. C. DAVISON.
DEPTH REGULATING MECHANISM FOR MOVING VESSELS.
APPLICATION FILED APR. 15, 1909.
946,659.
Patented Jan. 18, 1910.
3 SHEETS—SHEET 3.
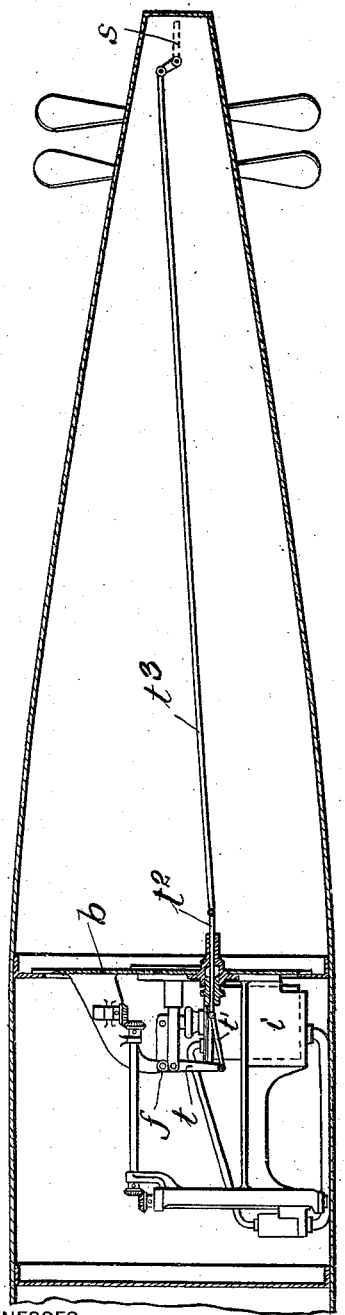
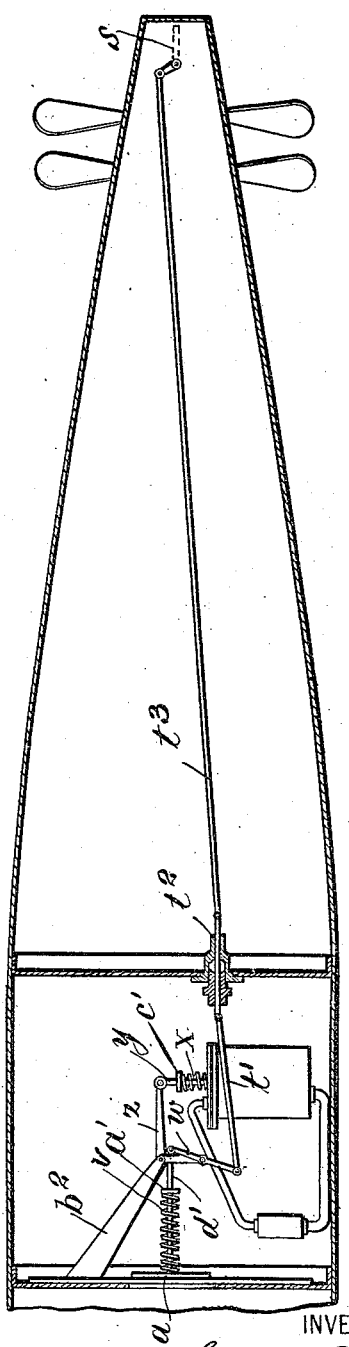
WITNESSES:
INVENTOR
Gregory C. Davison
BY
Pennie & Goldsborough
ATTORNEYS

UNITED STATES PATENT OFFICE.

GREGORY CALDWELL DAVISON, OF QUINCY, MASSACHUSETTS.

DEPTH-REGULATING MECHANISM FOR MOVING VESSELS.

946,659.  Specification of Letters Patent.  Patented Jan. 18, 1910.

Application filed April 15, 1909. Serial No. 490,105.

*To all whom it may concern:*

Be it known that I, GREGORY CALDWELL DAVISON, a citizen of the United States, residing at Quincy, in the county of Norfolk and State of Massachusetts, have invented certain new and useful Improvements in Depth-Regulating Mechanism for Moving Vessels; and I do hereby declare the following to be a full, clear, and exact description of the invention, such as will enable others skilled in the art to which it appertains to make and use the same.

The object of the invention is to provide a simple, compact, reliable and easily adjusted mechanism for automatically maintaining an automobile torpedo or the like on an even keel at a predetermined depth of submergence. To this end I subject a movable element such as flexible diaphragm to the pressure of the water of submergence and oppose the movement of the diaphragm, under the action of that pressure, by a force due to the displacement, by a float, of a relatively large body of a heavy liquid, and cause the resulting movement to affect the position of a depth-controlling rudder.

The particular nature and mode of operation of the invention will be understood from the following description and the accompanying drawings.

In the drawings Figure 1 is a central vertical section of a portion of a torpedo equipped with a form of my invention, the specific proportion and relative arrangement of the parts shown having been designed for installation in a standard Whitehead torpedo; Fig. 2 is a cross-section showing the depth regulating apparatus in rear elevation; Fig. 3 is a detail section on the line 3—3 of Fig. 1; Fig. 4 is an illustration, largely diagrammatic, of the depth regulating rudders in plan; Fig. 5 is a central vertical section showing somewhat diagrammatically the depth regulating apparatus and particularly its connection to the rudders, and Fig. 6 is a similar view illustrating a modification.

The flexible diaphragm $a$ may be positioned in any portion of the vessel where it is subjected to the pressure of the water of submergence. In the particular form illustrated it is located centrally in a transverse bulkhead which separates a chamber containing the depth regulating mechanism from a chamber farther aft which is in open communication with the water of submergence. This bulkhead is formed in part of a plate $b$ having attached to or formed integral with it a housing $b'$ extended to form a bearing sleeve as shown; and bracket arms $b^2$ and $b^3$ which serve to support the depth regulating mechanism. The flexible diaphragm $a$ is attached to a disk-shaped head $c$ on the end of a stem $d$, which projects through the bearing sleeve of the housing $b'$, and is fastened at its inner end to a short forked lever arm $e$ secured to shaft $f$ supported by bracket $b^2$.

Extending from the shaft $f$ toward the bulkhead is a longer lever arm $g$ to the free end of which is attached the upper end of the stem $h$ projecting from float $i$ within the float chamber $k$, the stem $h$ being surrounded by a flexible sleeve $l$, and the float chamber being supported in the bracket $b^3$. In the inner end of the bracket $b^3$ is formed a guideway in which is guided a projection from the fluid reservoir $m$ which projection has formed in it a nut engaged by elevating screw $n$ supported centrally of the guideway and having at its upper end a bevel pinion $o$ meshing with a corresponding pinion $o'$ on shaft $o^2$, which shaft is supported in the brackets $b^2$ and $b^3$ and is driven through bevel pinions $o^3$ and $o^4$ from a stub shaft $o^5$ mounted on bracket $b^2$ and containing at its upper end a square recess adapted to be engaged and turned by a suitable implement which may be inserted for that purpose through an appropriate opening in the shell of the vessel.

The fluid tank $m$, which is preferably filled with mercury, is in communication with the bottom of the float chamber through flexible pipe $p$ and with the top of the float chamber through flexible equalizing pipe $q$, and by operating the stub-shaft $o^5$ the vertical position of the reservoir may be adjusted to fix the depth of submergence at which the vessel will run. It will be observed that in the preferred construction shown the float $i$ is guided in its vertical movement by an upstanding stud $r$ rising from the bottom of the float chamber and that the float nearly fills the float chamber, so that a small quantity of the fluid will have the maximum effect upon the large float. The lifting power of the float, which is itself of a very light material such as wood, is substantially equal to the weight of the mercury, or other heavy fluid, displaced by the float, and a large saving in the total weight of the apparatus is thus attained.

Referring to Figs. 4 and 5, it will be observed that the depth regulating rudders $s$ are actuated by the mechanism previously described through a lever arm $t$ fixed on shaft $f$, and connecting rods $t'$, $t^2$ and $t^3$, the connecting rod $t^2$ passing through a suitable stuffing box and bearing sleeve fixed to the plate $b$.

The operation of these parts is as follows: When the torpedo is launched the flexible diaphragm is subjected to the pressure of the water of submergence which tends to force it inwardly. This tendency is opposed by the lifting power of the float $i$, which, of course, is proportional to the height of the mercury column which height may be varied at will by means of the elevating screw $n$. If the turning moment due to the pressure of the water on the diaphragm $a$ is less than the turning moment due to the lifting effect of the float, the lever $t$ and connecting rods will turn the rudders $s$ in a direction to further submerge the vessel; if the turning moment due to the pressure of the water on the diaphragm is greater than the turning moment due to the lifting effect of the float the rudders will be turned in a direction to bring the vessel nearer the surface, and the torpedo will seek, and remain at, that depth at which the turning moment of the water pressure is balanced by the turning moment due to the float; and if for any reason the vessel is inclined from the horizontal the height of the mercury column will be correspondingly varied and the vessel will be brought to an even keel in a manner which will be readily understood.

In the modification illustrated in Fig. 6 the inward movement of the diaphragm $a$ is opposed by a spring $v$ compressed between the diaphragm-plate and a fixed abutment through which rod $d'$ extends to the upper end of pivoted lever $w$, to the lower end of which is attached the connecting rod $t'$. The lifting effect of the float is opposed by a spring $x$ compressed between the cover of the float chamber and a fixed abutment $c'$ through which rod $y$ extends to one arm of a bell crank lever $z$ pivoted on bracket $b^2$ and carrying the pivot of the lever $w$. In this construction the normal depth of submergence of the vessel is controlled by the pressure of spring $v$ so that if the pressure on the diaphragm is sufficient to force inwardly the rod surrounded by the spring, the bell crank lever $z$ remaining stationary, the rudders will be turned to submerge the vessel, and if the pressure on the diaphragm is overbalanced by the spring $v$ the rudders will be turned to bring the vessel nearer the surface. If the vessel is inclined from an even keel the pressure of the mercury column acting against the spring $x$ will become effective to return it to an even keel. With this construction, by disconnecting the float from the bell crank lever $z$ and restraining that lever against turning a mechanism is provided which is controlled entirely by the pressure of the surrounding water and has no supplemental means for bringing the vessel to an even keel, and by disconnecting the diaphragm from the lever $w$ and fixing that lever in position with respect to the bell crank lever $z$ an arrangement is provided which will maintain the vessel at an even keel independently of the depth of submergence.

What I claim is:—

1. A depth regulating mechanism for moving vessels having a movable element subjected to the pressure of the water of submergence, in combination with a float displacing a heavy liquid and connected to move the movable element against the said pressure, a depth-controlling rudder, and connections from the movable element to the rudder.

2. A depth regulating mechanism for moving vessels having a movable element subjected to the pressure of the water of submergence, in combination with a float chamber containing a heavy liquid, a float nearly filling said chamber and connected to move the movable element against the said pressure, a depth-controlling rudder, and connections from the movable element to the rudder.

3. A depth regulating mechanism for moving vessels having a movable element subjected to the pressure of the water of submergence, in combination with a float chamber, a reservoir for a heavy liquid communicating with said chamber and spaced apart therefrom longitudinally of the vessel, a float within the float chamber and connected to move the movable element against the said pressure, an elevating screw engaging the reservoir whereby its vertical position may be changed, a depth-controlling rudder, and connections from the movable element to the rudder.

4. In depth regulating mechanism for moving vessels, a flexible diaphragm subjected to the pressure of the water of submergence, a depth-controlling rudder actuated by the movement of the diaphragm, and mechanism tending to move the diaphragm against the said pressure, said mechanism comprising a reservoir containing mercury, an elevating screw connected to said reservoir for changing its vertical position, a float chamber communicating with the reservoir but spaced apart therefrom longitudinally of the vessel, and a float in said chamber connected to the diaphragm to move it against the pressure of the water of submergence.

In testimony whereof I affix my signature, in presence of two witnesses.

GREGORY CALDWELL DAVISON.

Witnesses:
GEORGE A. SULLIVAN,
F. L. BRAKE.